United States Patent [19]

Kobayashi et al.

[11] Patent Number: 5,591,783
[45] Date of Patent: Jan. 7, 1997

[54] ULTRAVIOLET-CURABLE SILICONE COMPOSITION CONTAINING A POLYORGANOSILOXANE TERMINATED WITH A SILANOL GROUP AT BOTH ENDS OR AN ALCOHOL-MODIFIED POLYORGANOSILOXANE

[75] Inventors: Keiji Kobayashi, Tokyo, Japan; Roy M. Griswold, New York, N.Y.

[73] Assignee: Toshiba Silicone Co., Ltd., Tokyo, Japan

[21] Appl. No.: 385,883

[22] Filed: Feb. 9, 1995

[30] Foreign Application Priority Data

Feb. 18, 1994 [JP] Japan .................................. 6-043370

[51] Int. Cl.⁶ .............................. C08F 2/50; C08L 63/00; C08L 83/06; C08L 83/07
[52] U.S. Cl. .......................... 522/31; 522/99; 522/170; 522/172; 528/29; 528/32; 528/33
[58] Field of Search ............................ 522/31, 99, 170, 522/172; 528/29, 32, 33

[56] References Cited

U.S. PATENT DOCUMENTS

| | | | |
|---|---|---|---|
| 4,640,967 | 2/1987 | Eckberg | 522/99 |
| 4,978,726 | 12/1990 | Dohler et al. | 522/99 |
| 5,187,251 | 2/1993 | Jachmann et al. | 528/29 |

*Primary Examiner*—Susan W. Berman
*Attorney, Agent, or Firm*—Sughrue, Mion, Zinn, Macpeak & Seas

[57] ABSTRACT

An ultraviolet-curable silicone composition involving:

(A) 100 parts by weight of a polyorganosiloxane comprising structural units represented by the general formula $R^1_m R^2_n SiO_{(4-m-n)/2}$;

(B) from 0.1 to 10 parts by weight of a polyorganosiloxane which is blocked by $(OH)R^3_2 Si_{1/2}$ at both ends or (b) an alcohol-modified polyorganosiloxane containing two or more alcoholic OH groups per molecule; and (C) a catalytically effective amount of an onium salt as a photoinitiator.

11 Claims, No Drawings

ULTRAVIOLET-CURABLE SILICONE COMPOSITION CONTAINING A POLYORGANOSILOXANE TERMINATED WITH A SILANOL GROUP AT BOTH ENDS OR AN ALCOHOL-MODIFIED POLYORGANOSILOXANE

FIELD OF THE INVENTION

The present invention relates to an ultraviolet-curable silicone composition. More particularly, the present invention relates to an ultraviolet-curable silicone composition which exhibits releasability to an adhesive after being cured.

BACKGROUND OF THE INVENTION

It has heretofore been well known that a composition comprising a polyorganosiloxane as a main component is cured on the surface of a substrate such as various kinds of paper, synthetic film and fiber to form a film, thereby imparting to the substrate releasability with respect to an adhesive substance.

A composition which is cured upon condensation reaction as disclosed in, for example, JP-A-47-34447 (The term "JP-A" as used herein means an "unexamined published Japanese patent application") and a composition which is cured upon addition reaction as disclosed in, for example, JP-B-52-40918 (The term "JP-B" as used herein means an "examined Japanese patent publication") are known as such polyorganosiloxane compositions. However, since these curing reactions require heating, these polyorganosiloxane compositions cannot be applied unless the substrate is heat-resistant.

In order to overcome the above-described difficulty of the thermosetting silicone compositions, various ultraviolet-curable silicone compositions have been developed as disclosed in, for example, JP-A-56-166224, JP-A-58-213024, JP-A-60-47064, JP-A-60-84329, JP-A-61-293268, JP-A-1-297421, and JP-A-1-311103. An ultraviolet-light emitter is one type of light emitter. Because of its inexpensiveness, easy maintenance and little danger to the operator, this emitter finds the widest application. A curing method based on ultraviolet light is generally advantageous in that it requires a short curing time. Such a curing method is also advantageous in that a substrate which is damaged by heat energy does not need to be heated after coating the silicone composition because the silicone composition can be cured by irradiation with ultraviolet rays.

The ultraviolet-curable silicone compositions are roughly divided according to cure mechanism into the following four types:

(1) Compositions which are cured by reacting an Si—Vi group (Vi stands for vinyl group) and an Si—H group in the presence of a platinum catalyst by means of ultraviolet rays;

(2) Compositions in which an acrylic-functional silicone is cured in the presence of a radical cleavage-type photocatalyst by means of ultraviolet rays;

(3) Compositions which are cured by reacting an Si—Vi group and an SH group in the presence of a radical cleavage-type photocatalyst by means of ultraviolet rays; and (4) Compositions in which an epoxy-functional silicone is cured in the presence of a cation-generating catalyst by means of ultraviolet rays.

Silicone compositions of type (1) above are economically disadvantageous in that the expensive catalyst must be used in a large quantity.

Compositions of type (2) cure quickly, but the curing reaction must be conducted in an inert gas atmosphere because the cure is inhibited by oxygen. For this reason, they are disadvantageous in that the apparatus therefor must be specially designed and the running cost is high due to the use of an inert gas.

Compositions of type (3) have excellent curability with little curing inhibition by oxygen. However, the compositions have disadvantages in that because they contain mercapto groups, they have a strong offensive odor, which is unfavorable to the workers, and in that the compositions are so unstable that their shelf lives are short.

Compositions of type (4) cure by means of ultraviolet rays without suffering curing inhibition by oxygen and do not emit an offensive odor. Thus, the compositions of this type have exceedingly good properties.

Further, the epoxy-functional silicone compositions of type (4) are advantageous in that they exhibit a higher adhesiveness to the substrate than that of other ultraviolet-curable silicone compositions.

However, these silicone compositions are disadvantageous in that they exhibit different releasabilities to different adhesives. In particular, they are poor in releasability to reactive acrylic adhesives.

SUMMARY OF THE INVENTION

Accordingly, an object of the present invention is to provide an ultraviolet-curable silicone composition which exhibits an excellent releasability particularly to reactive acrylic adhesives without impairing curability and subsequent adhesion.

As a result of extensive studies to develop such an ultraviolet-curable silicone composition, it has been found that the addition of a polyorganosiloxane having a specific viscosity blocked with hydroxyl groups at both ends thereof or an alcohol-modified polyorganosiloxane having a specific viscosity to an epoxy-modified silicone as a base polymer makes it possible to obtain an ultraviolet-curable silicone composition which exhibits an excellent releasability to various adhesives, particularly reactive acrylic adhesives, without impairing curability and subsequent adhesion. Thus, the present invention has been completed based on this finding.

The present invention provides an ultraviolet-curable silicone composition comprising:

(A) 100 parts by weight of a polyorganosiloxane comprising structural units represented by the general formula $R^1_m R^2_n SiO_{(4-m-n)/2}$ wherein $R^1$'s, which may be the same or different, each represents a monovalent hydrocarbon group, $R^2$ represents a hydrogen atom, a divalent hydrocarbon group or a monovalent epoxy-functional organic group, and m and n each is an integer of from 0 to 3, with the proviso that the sum of m and n is an integer of from 0 to 3, at least two of all the organic groups $R^2$ being an epoxy-functional organic group;

(B) from 0.1 to 10 parts by weight of (a) a polyorganosiloxane having a viscosity of from 1 cP to 30,000 cP at 25° C. represented by the general formula $R^3_2SiO$ wherein $R^3$'s, which may be the same or different, each represents a monovalent hydrocarbon group, which is blocked with $(OH)R^3_2Si_{1/2}$ at the both ends thereof or (b) an alcohol-modified polyorganosiloxane having a viscosity of from 1 cP to 30,000 cP at 25° C. containing two or more alcoholic OH groups per molecule; and (C) a catalytically effective amount of an onium salt as a photoinitiator.

DETAILED DESCRIPTION OF THE INVENTION

The component (A) is a polyorganosiloxane containing two or more epoxy-functional organic groups per molecule. In the general formula $R^1{}_mR^2{}_nSiO_{(4-m-n)/2}$, $R^1$ represents a monovalent hydrocarbon group. Examples of such a monovalent hydrocarbon group include an alkyl group such as methyl, ethyl, propyl, butyl, hexyl or octyl, an aryl group such as phenyl or tolyl, and an alkenyl group such as vinyl or allyl. Particularly preferred among these hydrocarbon groups is a methyl group because it provides an excellent releasability. $R^2$ represents a hydrogen atom, a divalent hydrocarbon group or a monovalent epoxy-functional organic group. Examples of the divalent hydrocarbon group include a methylene group, ethylene group, and propylene group. Examples of the monovalent epoxy-functional organic group include organic groups having a glycidyl group, glycidoxy group, 3,4-epoxycyclohexyl group, 2,3-epoxycyclopentyl group, etc.

The polyorganosiloxane as the component (A) of the present invention can be obtained by an addition reaction (hydrosilylation) of a polymethylhydrogensiloxane with an olefinic epoxy monomer such as 4-vinylcyclohexene oxide, allylglycidyl ether or 7-epoxy-1-octene in the presence of a catalyst such as platinum compound. The polyorganosiloxane as the component (A) can also be obtained by a process which comprises pre-crosslinking a polymethylhydrogensiloxane to an alkenyl-functional polyorganosiloxane, and then allowing the resulting material to undergo addition reaction with an olefinic epoxy monomer. The polyorganosiloxane thus obtained has a siloxane unit connected to another silicon atom via a divalent hydrocarbon group. The suffixes m and n each is an integer of from 0 to 3, with the proviso that (m+n) is an integer of from 0 to 3.

In order to cure the silicone composition at a practical rate upon irradiation with ultraviolet rays, it is necessary for the component (A) to have two or more epoxy-functional organic groups per molecular on the average.

The component (B) is the most characteristic component in the present invention, and is (a) a polyorganosiloxane terminated with a silanol group at both ends or (b) an alcohol-modified polyorganosiloxane.

In the component (a), $R^3$ represents a monovalent hydrocarbon group. Examples of the monovalent hydrocarbon group include an alkyl group such as methyl, ethyl, propyl, butyl, hexyl or octyl, an aryl group such as phenyl or tolyl, and an alkenyl group such as vinyl or allyl. Particularly preferred among these hydrocarbon groups is methyl group because it provides an excellent releasability.

In the component (b), the alcoholic OH group is an OH group connected to a carbon atom in a hydrocarbon group or the like. For example, an OH-containing hydrocarbon group connected to a silicon atom in polyorganosiloxane is $HO(CR^4{}_2)_p$— wherein $R^4$'s which may be the same or different each represents a hydrogen atom or a monovalent hydrocarbon group having the same meaning as $R^3$ and p represents an integer of from 1 to 20. Examples of such an OH-containing hydrocarbon group include $HO(CH_2)_3$—, $HO(CH_2)_4$—, $HO(CH_2)_5$—, $HOCH_2(CH_3)CH_2CH_2$—, and $HOCH(CH_3)CH_2CH_2$—. Further examples of such an OH-containing hydrocarbon group include an OH-containing cycloalkyl group such as a 4-hydroxycyclohexyl group, and an OH-containing aryl group such as a phenol group. OH-containing hydrocarbon groups containing ether bonds in carbon bonds can also be used. Preferred among these OH-containing hydrocarbon groups are groups represented by $HO(CR^4{}_2)_p$—, particularly $HO(CH_2)_3$— and $HO(CH_2)_4$—.

The structure of the polysiloxane as the component (b) can be straight-chain, cyclic or branched, preferably straight-chain.

The polysiloxane (b) can be easily obtained by subjecting a polymethylhydrogensiloxane to addition reaction with an alcohol containing an unsaturated group such as a vinyl group to modify the same.

The component (B) has a viscosity of from 1 cP to 30,000 cP, and preferably from 5 cP to 1,000 cP, at 25° C. If the viscosity of the component (B) exceeds 30,000 cP, the component (B) becomes incompatible with the component (A), resulting in a remarkable drop in curability as well as subsequent adhesion.

The amount of the component (B) added is from 0.1 to 10 parts by weight, and preferably from 0.5 to 5 parts by weight, per 100 parts by weight of the component (A). If the amount of the component (B) added is less than 0.1 parts by weight, an effect of a releasability cannot be obtained. On the other hand, if the amount of the component (B) added exceeds 10 parts by weight, the curability and the subsequent adhesion markedly deteriorate.

The photoinitiator (C) is not specifically limited so long as it is an onium salt which is compatible with the components (A) and (B) and is capable of cleaving an epoxy ring with light.

The photoinitiator which is suitably used in the present invention is represented by the general formula $R^5{}_2I^+MX_n{}^-$, $R^5{}_2S^+MX_n{}^-$, $R^5{}_2Se^+MX_n{}^-$, $R^5{}_2SC^{30}MX_n{}^-$, $R^5{}_2P^+MX_n{}^-$ or $R^5{}_2N^+MX_n{}^-$.

In the above-described general formulae, $R^5$ represents a substituted or unsubstituted aromatic hydrocarbon group or aromatic heterocyclic group. Examples of such a substituted or unsubstituted aromatic hydrocarbon group or aromatic heterocyclic group include a (1) $C_{6-20}$ aromatic hydrocarbon group, (2) $C_{6-26}$ aromatic hydrocarbon group substituted by 1 to 4 monovalent groups selected from the group consisting of $C_{1-8}$ alkoxyl group, $C_{1-8}$ alkyl group, nitrogen atom, bromine atom, cyano group, carboxyl group and mercapto group, and (3) $C_{1-30}$ same or different organic groups selected from the group consisting of aromatic heterocyclic groups containing pyridyl group, thiophenyl group, pyranyl group, etc. $MX_n{}^+$ represents an anion selected from the group consisting of $BF_4{}^-$, $PF_6{}^-$, $AsF_6{}^-$, $SbF_6{}^-$, $SbCl_6{}^-$, $HSO_4{}^-$ and $ClO_4{}^-$.

In particular, the photoinitiator (C) is preferably a diaryl iodonium salt such as bis(dodecylphenyl)iodonium hexafluoroantimonate.

The amount of the photoinitiator is not specifically limited, but is preferably from 0.5 to 3.0 parts by weight per 100 parts by weight of the component (A) from the standpoint of curing rate and cost.

The composition of the present invention exhibits an excellent curability and provides a cured film which shows a high subsequent adhesion and releasability to an adhesive.

The composition of the present invention can be easily cured only by irradiation with ultraviolet rays free from heating, making it possible to produce tapes and labels at a high rate and low temperature. Therefore, the composition of the present invention is useful to attain significantly improved production efficiencies of these processes.

The present invention will be further described in the following examples, but the present invention should not be construed as being limited thereto. In these examples, all parts and % are by weight. The viscosity is determined at 25° C.

(Preparation of sample)

Each of the compositions prepared in the Examples and the Comparative Examples was coated on a polyethylene-laminated paper (75 g/m$^2$) at a coating thickness of 1.3 g/m$^2$. The coated paper was conveyed by a conveyor at a rate of 5 m/min. while being irradiated with ultraviolet rays emitted by a single 120 W/cm ultraviolet emitter (H Bulb, available from Fusion Corp.) installed at a height of 9.3 cm from the conveyor surface to cure the coating. After curing, the resulting coated papers were aged for 1 day and then subjected to the following tests.

(Measurement of peel strength)

To the surface of the cured coating on the aged coated paper was applied SK Dine 801B (reactive acrylic adhesive, available from Soken Kagaku K.K.). The material was then heated to a temperature of 100° C. for 3 minutes and dried. Thereafter, a high quality paper (65 g/m$^2$) was laminated on the material. The laminate was then slit into 5-cm wide strips. The sample was then aged in a 25° C.×50% RH constant temperature and humidity bath under a load of 20 g/cm$^2$ for 1 day. The high quality paper was then peeled off at an angle of 180° at a rate of 0.3 m/min to determine the peel strength.

(Measurement of percent subsequent adhesion)

To the surface of the cured coating on the coated paper which had been aged for 1 day was applied Nitto 31B Tape (trade name, manufactured by Nitto Denko Corporation; 2.5 cm wide). The laminate was then allowed to stand at a temperature of 70° C. for 20 hours under a load of 20 g/cm$^2$. The tape was peeled off, and then applied to a stainless steel plate (JIS C2107) by pressing the tape with a 2-kg rubber roller. This sample was aged at a temperature of 25° C. for 3 hours, and the tape was then peeled off at an angle of 180° to determine the peel strength (f). Separately, a blank sample was prepared using Nitto 31B Tape applied to a polytetrafluoroethylene film, and its peel strength ($f_0$) was measured in the same manner as above.

Percent subsequent adhesion (%) was calculated using the following equation:

Percent subsequent adhesion (%)=$f/f_0$×100

(Measurement of curability)

After being irradiated with ultraviolet rays, the coating was lightly rubbed on the surface thereof to examine the surface conditions thereof. In the tables below, x indicates undercured surface, △ indicates completely cured surface with poor adhesion, and ○ indicates completely cured surface with excellent adhesion.

(Synthesis of Epoxy-Modified Silicone Oil [I])

With 1,000 parts of a polymethylhydrogensiloxane both ends of which had been blocked with a trimethylsilyl group, having a viscosity of 16 cP at 25° C. and a hydrogen content of 0.16% by weight was mixed 200 parts of a polydimethylsiloxane both ends of which had been blocked with a dimethylvinyl group, having a viscosity of 400 cP at 25° C. To the resulting mixture was added an isopropyl alcohol (IPA) solution of chloroplatinic acid in an amount of 15 ppm as calculated in terms of the amount of platinum. Reaction was then conducted at 50° C. for 1 hour. To the resulting reaction mixture were then added dropwise 250 parts of 4-vinylcyclohexene oxide over a period of 2 hours. Although this addition was accompanied with heat generation, the reaction mixture was kept at a temperature between 50° and 60° C. to conduct reaction for 4 hours. Thereafter, topping was effected at 130° C. for 2 hours under a pressure of 10 mmHg to remove unreacted ingredients and low-boiling fractions. Thus, epoxy-modified silicone oil [I] was obtained which had a viscosity as measured at 25° C. of 250 cP.

(Synthesis of Epoxy-Modified Silicone Oil [II])

To 1,000 parts of a polymethylhydrogensiloxane both ends of which had been blocked with a dimethylhydrosiloxy group, having a viscosity of 130 cP at 25° C. and a hydrogen content of 0.09% by weight was added an IPA solution of chloroplatinic acid in an amount of 10 ppm as calculated in terms of the amount of platinum. The mixture was heated to a temperature of 50° C. To the mixture were then added dropwise 200 parts of 4-vinylcyclohexene oxide over a period of 2 hours. Although this addition was accompanied with heat generation, the reaction mixture was kept at a temperature between 50° C. and 70° C. to conduct reaction for 4 hours. Thereafter, topping was effected at 150° C. for 2 hours under a pressure of 10 mmHg to remove unreacted ingredients and low-boiling fractions. Thus, epoxy-modified silicone oil [II] was obtained which had a viscosity as measured at 25° C. of 340 cP.

EXAMPLE 1

To 100 parts of the epoxy-modified silicone oil [I] were added 5 parts of a polydimethylsiloxane both ends of which had been blocked with hydroxyl groups, having a viscosity of 8 cP at 25° C., and 1 part of bis(dodecylphenyl)iodoniumhexafluoroantimonate (hereinafter referred to as "photoinitiator [I]"). The mixture was then stirred to prepare a coating solution. This coating solution was then evaluated for compatibility by the following criteria. In the tables below, ○ indicates a mixture which can be smoothly homogenized to exhibit an excellent compatibility, △ indicates a mixture which can be homogenized with thorough stirring to exhibit an excellent compatibility, and x indicates a mixture which cannot be homogenized. This coating solution was also evaluated for curability, peel strength and percent subsequent adhesion in the same manner as defined above. The results obtained are shown in Table 1 below.

EXAMPLE 2

A coating solution was prepared and evaluated in the same manner as in Example 1 except that 5 parts of the polydimethylsiloxane both ends of which had been blocked with hydroxyl groups, having a viscosity of 8 cP at 25° C., were replaced by 2 parts of a polydimethylsiloxane both ends of which had been blocked with hydroxyl groups, having a viscosity of 700 cP at 25° C. The results obtained are shown in Table 1 below.

EXAMPLE 3

A coating solution was prepared and evaluated in the same manner as in Example 1 except that 5 parts of the polydimethylsiloxane both ends of which had been blocked with hydroxyl groups, having a viscosity of 8 cP at 25° C., were replaced by 2 parts of a polydimethylsiloxane both ends of which had been blocked with hydroxyl groups, having a viscosity of 20,000 cP at 25° C. The results obtained are shown in Table 1 below.

Comparative Example 1

To 100 parts of the epoxy-modified silicone oil [I] was added 1 part of the photoinitiator [I]. The mixture was then stirred to prepare a coating solution. This coating solution was evaluated in the same manner as in Example 1. The results obtained are shown in Table 1 below.

Comparative Example 2

A coating solution was prepared and evaluated in the same manner as in Example 1 except that the amount of the polydimethylsiloxane both ends of which had been blocked with hydroxyl groups, having a viscosity of 8 cP at 25° C. was changed to 0.05 parts. The results obtained are shown in Table 1 below.

Comparative Example 3

A coating solution was prepared and evaluated in the same manner as in Example 2 except that the amount of the polydimethylsiloxane both ends of which had been blocked with hydroxyl groups, having a viscosity of 700 cP at 25° C. was changed to 15 parts. The results obtained are shown in Table 1 below.

TABLE 1

| | Example | | | Comparative Example | | |
|---|---|---|---|---|---|---|
| | 1 | 2 | 3 | 1 | 2 | 3 |
| Composition (parts) | | | | | | |
| Epoxy-modified silicone oil [I] | 100 | 100 | 100 | 100 | 100 | 100 |
| Polydimethylsiloxane terminated by hydroxyl groups at both ends | | | | | | |
| 8 cP | 5 | | | | 0.05 | |
| 700 cP | | 2 | | | | 15 |
| 20,000 cP | | | 2 | | | |
| Photoinitiator [I] | 1 | 1 | 1 | 1 | 1 | 1 |
| Results of evaluation | | | | | | |
| Compatibility | ○ | ○ | ○ | ○ | ○ | ○ |
| Curability | ○ | ○ | ○ | ○ | ○ | Δ |
| Percent subsequent adhesion (%) | 99 | 98 | 95 | 99 | 99 | 80 |
| Peel strength (gf/5 cm) | 49 | 47 | 38 | 120 | 118 | 34 |

EXAMPLE 4

To 100 parts of the epoxy-modified silicone oil [II] were added 0.5 part of a polydimethylsiloxane both ends of which had been blocked with hydroxyl groups, having a viscosity of 8 cP at 25° C., and 1 part of the photoinitiator [I]. The mixture was then stirred to prepare a coating solution. The coating solution was then evaluated in the same manner as in Example 1. The formulations are shown in Table 2 below. The results of evaluation are shown in Table 3 below.

EXAMPLE 5

A coating solution was prepared and evaluated in the same manner as in Example 4 except that 0.5 part of the polydimethylsiloxane both ends of which had been blocked with hydroxyl groups, having a viscosity of 8 cP at 25° C., were replaced by 5 parts of a polydimethylsiloxane both ends of which had been blocked with hydroxyl groups, having a viscosity of 700 cP at 25° C. The formulations were shown in Table 2 below. The results obtained are shown in Table 3 below.

EXAMPLE 6

50 parts of the epoxy-modified silicone oil [I] were mixed with 50 parts of the epoxy-modified silicone oil [II]. To the mixture were added 3 parts of the polydimethylsiloxane both ends of which had been blocked with hydroxyl groups, having a viscosity of 8 cP at 25° C., and 1 part of the photoinitiator [I]. The mixture was stirred to prepare a coating solution. The coating solution was then evaluated in the same manner as in Example 2. The formulations are shown in Table 2 below. The results of evaluation are shown in Table 3 below.

EXAMPLE 7

A coating solution was prepared and evaluated in the same manner as in Example 5 except that 5 parts of the polyorganosiloxane both ends of which had been blocked with hydroxyl groups, having a viscosity of 700 cP at 25° C., were replaced by 1 part of a polydimethylsiloxane both ends of which had been modified with allyl alcohol, having a viscosity of 70 cP at 25° C. The formulations were shown in Table 2 below. The results obtained are shown in Table 3.

Comparative Example 4

A coating solution was prepared and evaluated in the same manner as in Example 4 except that 0.5 part of the polyorganosiloxane both ends of which had been blocked with hydroxyl groups, having a viscosity of 8 cP at 25° C., were replaced by 2 parts of a polydimethylsiloxane both ends of which had been blocked with hydroxyl groups, having a viscosity of 1,000,000 cP at 25° C. The formulations were shown in Table 2 below. The results obtained are shown in Table 3 below.

Comparative Example 5

A coating solution was prepared and evaluated in the same manner as in Example 4 except that 0.5 part of the polyorganosiloxane both ends of which had been blocked with hydroxyl groups, having a viscosity of 8 cP at 25° C., were replaced by 2 parts of a polydimethylsiloxane both ends of which had been blocked with hydroxyl groups, having a viscosity of 80,000 cP at 25° C. The formulations were shown in Table 2 below. The results obtained are shown in Table 3 below.

Comparative Example 6

A coating solution was prepared and evaluated in the same manner as in Example 5 except that 5 parts of the polyorganosiloxane both ends of which had been blocked with hydroxyl groups, having a viscosity of 700 cP at 25° C., were replaced by 5 parts of a polydimethylsiloxane both ends of which had been blocked with trimethylsiyl groups, having a viscosity of 700 cP at 25° C. The formulations were shown in Table 2 below. The results obtained are shown in Table 3 below.

Comparative Example 7

To 100 parts of the epoxy-modified silicone oil [II] was added 1 part of the photoinitiator [I]. The mixture was then stirred to prepare a coating solution. The coating solution was evaluated in the same manner as in Example 4. The formulations were shown in Table 2 below. The results of evaluation are shown in Table 3 below.

TABLE 2

|  | Example | | | | Comparative Example | | | |
| --- | --- | --- | --- | --- | --- | --- | --- | --- |
|  | 4 | 5 | 6 | 7 | 4 | 5 | 6 | 7 |
| Composition (parts) | | | | | | | | |
| Epoxy-modified silicone oil [I] | — | — | 50 | — | — | — | — | — |
| Epoxy-modified silicone oil [II] | 100 | 100 | 50 | 100 | 100 | 100 | 100 | 100 |
| Polydimethylsiloxane terminated by hydroxyl groups at both ends | | | | | | | | |
| 8 cP | 0.5 | — | 3 | — | — | — | — | — |
| 700 cP | — | 5 | — | — | — | — | — | — |
| 80,000 cP | — | — | — | — | — | 2 | — | — |
| 1,000,000 cP | — | — | — | — | 2 | — | — | — |
| Polydimethylsiloxane terminated by trimethylsilyl groups at both ends | | | | | | | | |
| 700 cP | — | — | — | — | — | — | 5 | — |
| Polydimethylsiloxane terminated by allyl alcohol at both ends | — | — | — | 1 | — | — | — | — |
| Photoinitiator [I] | 1 | 1 | 1 | 1 | 1 | 1 | 1 | 1 |

TABLE 3

|  | Example | | | | Comparative Example | | | |
| --- | --- | --- | --- | --- | --- | --- | --- | --- |
| Results of evaluation | 4 | 5 | 6 | 7 | 4 | 5 | 6 | 7 |
| Compatibility | o | o | o | o | x | Δ | x | o |
| Curability | o | o | o | o | x | Δ | Δ | o |
| Percent subsequent adhesion (%) | 98 | 97 | 98 | 98 | 5 | 76 | 45 | 98 |
| Peel strength (gf/5 cm) | 85 | 72 | 44 | 56 | 4 | 28 | 18 | 450 |

While the invention has been described in detail and with reference to specific embodiments thereof, it will be apparent to one skilled in the art that various changes and modifications can be made therein without departing from the spirit and scope thereof.

What is claimed is:

1. An ultraviolet-curable silicone composition comprising:
   (A) 100 parts by weight of a polyorganosiloxane comprising structural units represented by the general formula $R^1{}_m R^2{}_n SiO_{(4-m-n)/2}$ wherein $R^1$'s, which may be the same or different, each represents a monovalent hydrocarbon group, $R^2$ represents hydrogen atom, a divalent hydrocarbon group or a monovalent epoxy-functional organic group, and m and n each represents an integer of from 0 to 3, with the proviso that the sum of m and n is an integer of from 0 to 3, at least two of $R^2$ are epoxy-functional organic groups;
   (B) from 0.1 to 10 parts by weight of (a) a polyorganosiloxane having a viscosity of 1 cP to 30,000 cP at 25° C. represented by the general formula $R^3{}_2SiO$ wherein $R^3$'s, which may be the same or different, each represents a monovalent hydrocarbon group, which is blocked by $(OH)R^3{}_2Si_{1/2}$ at the both ends thereof, or (b) an alcohol-modified polyorganosiloxane having a viscosity of from 1 cP to 30,000 cP at 25° C. containing two or more alcoholic OH groups per molecule; and
   (C) a catalytically effective amount of an onium salt as a photoinitiator.

2. An ultraviolet-curable silicone composition as claimed in claim 1, wherein the component (B) has a viscosity at 25° C. of from to 1,000 cP.

3. An ultraviolet-curable silicone composition as claimed in claim 1, wherein the component (B) is used in an amount of from 0.5 to 5 parts by weight per 100 parts by weight of the component (A).

4. An ultraviolet-curable silicone composition as claimed in claim 1, wherein the component (C) is used in an amount of from 0.5 to 3.0 parts by weight per 100 parts by weight of the component (A).

5. An ultraviolet-curable silicone composition as claimed in claim 1, wherein the component (C) is a diaryl iodonium salt.

6. An ultraviolet-curable silicone composition as claimed in claim 5, wherein the diaryl iodonium salt is bis(dodecylphenyl)iodonium hexafluoroantimonate.

7. An ultraviolet-curable silicone composition as claimed in claim 1, wherein component (B) is the polyorganosiloxane having a viscosity of 1 cP to 30,000 cP at 25° C. represented by the general formula $R^3{}_2SiO$ wherein $R^3$s which may be the same or different each represent a monovalent hydrocarbon, which is blocked by $(OH)R^3{}_2Si_{1/2}$ at the both ends thereof.

8. An ultraviolet-curable silicone composition as claimed in claim 7, wherein component (B) is polydimethylsiloxane terminated by hydroxyl groups at both ends.

9. An ultraviolet-curable silicone composition as claimed in claim 7, wherein component (B) is polydimethylsiloxane terminated by allyl alcohol at both ends.

10. An ultraviolet-curable silicone composition as claimed in claim 1, wherein component (B) is the alcohol-modified polyorganosiloxane having a viscosity of from 1 cP to 30,000 cP at 25° C. containing two or more alcoholic OH groups per molecule.

11. An ultraviolet-curable silicone composition as claimed in claim 1, wherein component (A) is a polyorganosiloxane obtained by pre-crosslinking a polymethylhydrogensiloxane to an alkenyl-functional polyorganosiloxane, and then allowing the resulting material to addition react with an olefinic epoxy monomer.

* * * * *